3,627,476
AMIDE-GLYOXAL ADDITION PRODUCTS AND THEIR USE AS CROSSLINKING AGENTS

Sidney L. Vail and Andrew G. Pierce, Jr., New Orleans, La., Clifford M. Moran, San Gabriel, Calif., and Robert H. Barker, Metairie, La., assignors to the United States of America as represented by the Secretary of Agriculture
No Drawing. Original application Feb. 23, 1966, Ser. No. 529,251. Divided and this application Apr. 9, 1970, Ser. No. 31,437
Int. Cl. D06m *13/12, 13/38*
U.S. Cl. 8—116.3        2 Claims

ABSTRACT OF THE DISCLOSURE

N-substituted amido-glyoxal addition products are formed (2M/1M) and used to treat cellulosic materials under conditions of acid catalysis.

---

This application is a division of copending application Ser. No. 529,251, filed Feb. 23, 1966.

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of relatively stable N-methylol types of derivatives, many of which may be obtained by the addition of N-substituted amido type compounds to glyoxal. More specifically, the present invention relates primarily to the preparation of a new class of compounds of the following general structure:

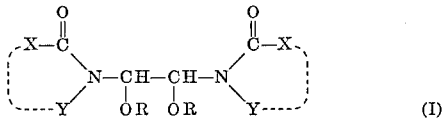

(I)

wherein R is hydrogen, an alkyl group of one to four carbon atoms, or an acyl group of one to four carbon atoms; Y is *not* hydrogen, but an alkyl or acyl group of one to four carbon atoms or part of a cyclic structure as indicated by the dotted lines in structure I; and X is hydrogen, an alkyl group of one to four carbon atoms when Y is an acyl group, or part of a cyclic structure as indicated by the dotted lines in structure I. As part of a cyclic structure X and Y may contain other functional groups such as carbonyl (CO). In addition to compounds of structure I the present invention relates to similar type compounds of the following general structure:

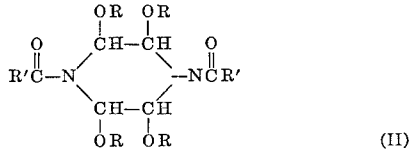

(II)

wherein R' is hydrogen or an alkyl group of one to four carbon atoms which may or may not contain substituent groups such as nitrile, alkoxide, halide, etc., and R is as described by structure I. The amido-type compounds also relates to the use of these new classes of compounds as new textile finishing agents for cellulosic fabrics. In addition, these compounds may be used in resin applications, textile finishing, pharmaceutical, and allied industries, or as intermediates in these fields.

The N-substituted amido type compounds, considered to be more promising for formation of compounds of structure I (R=H) by addition to glyoxal, are N-substituted formamides, lactams, and imides. Also, related amido derivatives containing electron withdrawing groups on the acyl or N-substituent portions are considered to be satisfactory amido-type compounds to form linear N,N'-(1,2-dihydroxyethylene) derivatives similar to those described by structure I. The amido-type compounds which are considered to be particularly well suited for addition to glyoxal in this process include N-methylformamide, 2-pyrrolidone, succinimide, maleimide, diacetamide, hydantoin, phthalimide, ε-caprolactom, and similar compounds.

Similarly, compounds of structure II (R=H) may be considered to be adducts of R'CONHCHOH-CHOHNHCOR' and glyoxal, or of two moles of R'CONH$_2$ and two moles of glyoxal. Although the mechanism of formation is not completely understood, it is considered that compounds of structure II (R=H) are formed more readily by use of amides, particularly where R'=H or R'=alkyl groups containing electron withdrawing groups such as nitrile, alkoxide, halide, etc.

It should be obvious to those skilled in the art that the above listings are intended only as examples and are not meant to limit this invention to these specific compounds.

The compounds of this invention are considered to be superior to those disclosed in the prior art in several respects. The absence of an NH group in the molecule removes a site for chemical degradation of the molecule. This proton is generally easily removed by alkali or chlorine which normally leads to an unsatisfactory situation, i.e., chlorine damage when such compounds are used to produce wash-wear finishes for cellulosic fabrics. In addition, compounds of structure II contain four hydroxyl groups capable of further modification. Derivatives (esters and ethers) of compounds of structure I and II are described in the examples below.

The compounds of this invention in concentrations of from two to twenty weight percent can be used to treat substantially any hydrophilic fibrous cellulosic material such as cotton, rayon, ramie, jute, and the like, or blends of such cellulosic material with non-cellulosic material which can be impregnated with a liquid, dried, and cured. In addition to being employed as the sole methylol agent in the treating solution of the present invention, the N-methylol derivatives of this invention may also be used in combination with various conventional treating agents to produce economical and improved cellulosic textile products.

In a typical treatment by the process of this invention, the solution applied to the cellulosic material would comprise about 2 to 20 weight percent of the amide-glyoxal addition product, 0.3 to 3.0 weight percent of suitable catalyst to promote the reaction, and the remainder water. The above percentages are all based upon the weight of the solution. Any catalyst useful for curing methylolamide-type finishing agents such as magnesium chloride, zinc nitrate, or other Lewis-type acids may be used.

It is also within the scope of our invention to add minor proportions of other agents, such as those required to modify the feel or "hand" of the treated fabric.

In the process of this invention, the cellulosic material is impregnated by passing the fabric into and through the treating solution and then removing the excess by squeezing between pad rolls until the amount of solution retained (pick-up) is about 50 to 100%, preferably about 90–100% of the dry fabric weight. The fabric is dried, and then heated briefly at an elevated temperature, usually 1 to 3 minutes at 140 to 160° C., to cause reaction of the finishing agent.

The following examples are given by way of illustration and not by way of limitation of the invention. The detailed procedures given below in the examples are illustrative, and are not the only or specific conditions for the synthesis of the compounds of this invention or for the production of an acceptable finished textile. Many variations or additions within these procedures can be made, as will be readily apparent to those skilled in the art. In the examples all parts and percentages are by weight and temperatures are in degrees centigrade unless noted otherwise. The fabrics were tested by the following methods:

Those described in the test of the American Society for Testing Materials are:

Wrinkle recovery, Monsanto Method, D1295–60T
Breaking strength, D1682–59T

The test evaluating the damage caused by retained chlorine is described in American Association of Textile Chemists and Colorists standard test method 92–1962 ("scorch test").

EXAMPLE 1

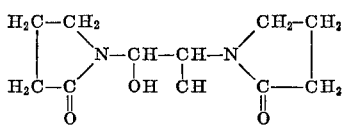

N,N'-1,2-dihydroxyethylenebis(2-pyrrolidone)

To 85 grams (1 mole) of 2-pyrrolidone was added 72.5 grams (0.5 mole) of 40% glyoxal. On adjusting the solution to an alkaline pH of about eight with 20% sodium hydroxide, the solution heated to 65° and a precipitate formed. The solution was filtered while still warm to produce 74 grams of a dry, crude product. The residue was worked up to yield 10 grams more. Yield—74%. Product was recrystallized from ethanol-water and melted at 190–192° with decomposition.

Elemental analyses.—Calculated for $C_{10}H_{16}N_2O_4$ (percent): C, 52.62; H, 7.07; N, 12.27. Found (percent): C, 52.90; H, 7.27; N, 12.15.

EXAMPLE 2

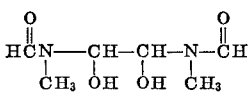

N,N'-1,2-dihydroxyethylenebis(methylformamide)

To 59 grams (1 mole) of methylformamide was added 73 grams (0.5 mole) of 40% glyoxal. The solution was adjusted to a pH of eight with 20% sodium hydroxide. After standing at room temperature for 48 hours, with sodium bicarbonate added to maintain an alkaline pH of 8–9, the darkened solution was stored at about −15°. In two to four weeks' time, two small batches of crystals were obtained. Recrystallization from ethanol-water and washing with ethanol produced a white crystalline material which melted at 156–158° with decomposition starting at 140–150°. On standing the product darkened. Yield—14%. Evaporation of the residue using vacuum increased the yield to 20%.

Elemental analyses.—Calculated for $C_6H_{12}N_2O_4$ (percent): C, 40.91; H, 6.87; N, 15.90. Found (percent): C, 41.05; H, 6.80; N, 15.73.

EXAMPLE 3

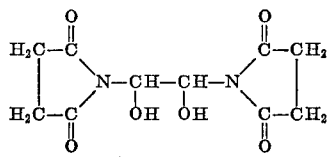

N,N'-(1,2-dimethoxyethylene)bis(2-pyrrolidone)

Ten grams of succinimide were dissolved in 50 ml. of distilled water. To this solution were added 13.6 grams of 40% aqueous glyoxal and the solution was adjusted to pH 8–9 with dilute sodium hydroxide. Crystallization of the product commenced within one hour. After standing for 3 days, the solution was filtered and the crystals collected were washed 3 times with distilled water and 3 times with absolute ethanol and air dried. Product melted at 182.5–184.5°. Yield—24% with no attempt made to work up the residue.

Elemental analyses.—Calculated for $C_{10}H_{12}N_2O_6$ (percent): C, 46.88; H, 4.72; N, 10.93. Found (percent): C, 46.99; H, 4.78; N, 11.05.

EXAMPLE 4

N,N'-(1,2-dimethoxyethylene) bis(2-pyrrolidone)

To 3 grams of the product isolated in Example 1 were added 40 milliliters of methanol and one drop of 6 N hydrochloric acid. The solution was refluxed for one hour and the diether isolated by evaporation to dryness. The product, recrystallized from methanol melted at 199–202°.

Elemental analyses.—Calculated for $C_{12}H_{20}N_2O_4$ (percent): C, 56.23; H, 7.87; N, 10.93. Found (percent): C, 56.35; H, 7.74; N, 10.90.

EXAMPLE 5

N,N'-(1,2-diacetoxyethylene)bissuccinimide

To 3 grams of the product from Example 3 were added 50 milliliters of acetic anhydride and one drop of concentrated sulfuric acid. After standing at room temperature for one hour with no apparent reaction, the mixture was heated slowly to 95° at which point the solids dissolved. The reaction mixture was left standing at room temperature overnight and the precipitate which formed was filtered off. These solids melted at 250–260° with decomposition.

Elemental analyses.—Calculated for $C_{14}H_{16}N_2O_8$ (percent): C, 49.41; H, 4.74; N, 8.23. Found (percent): C, 49.10; H, 4.56; N, 8.52.

EXAMPLE 6

1,4-diformyl-2,3,5,6-tetrahydroxypiperazine

One mole of formamide was dissolved in 0.5 mole of glyoxal, 40% solution. The pH of the mixture was adjusted to 9–10 with aqueous sodium hydroxide. The solution was left standing at room temperature. A white precipitate formed which after filtration, washing with water, and drying melted at about 225° with decomposition.

Elemental analyses.—Calculated for $C_6H_{10}N_2O_6$ (percent): C, 34.94; H, 4.89; N, 13.59; (mol wt. 206). Found (percent): C, 34.59; H, 5.04; N, 13.49; (mol. wt. (by osmometer) 201).

EXAMPLE 7

2,3,5,6-tetraacetoxy-1,4-diformylpiperazine

A mixture of 4 grams of product from Example 6, 90 milliliters of acetic anhydride, and 0.5 milliliter concentrated sulfuric acid was heated at 60° for 2 hours. The mixture was filtered while hot, and then it was cooled in ice. The white crystalline product which formed on chilling was found to melt at 255–256° with decomposition.

Elemental analyses.—Calculated for $C_{14}H_{18}N_2O_{10}$ (percent): C, 44.92; H, 4.84; N, 7.48; (mol. wt. 374). Found (percent): C, 45.04; H, 4.86; N, 7.37; (mol. wt. (by osmometer) 370).

EXAMPLE 8

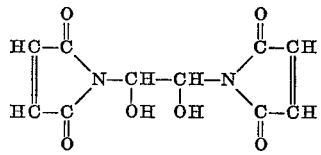

N,N'-1,2-dihydroxyethylenebismaleimide

Five grams of maleimide were dissolved in 50 ml. of distilled water. To this solution was added 3.73 grams of 40% aqueous glyoxal which had been previously made alkaline (pH–8) with sodium bicarbonate. The desired product crystallized soon after mixing, but additional sodium bicarbonate had to be added to maintain a pH of about 8. After 24 hours at room temperature the mixture was filtered. The solid product was washed with distilled water and dried over a desiccant. The product melted at 172–173.5° with decomposition.

Elemental analyses.—Calculated for $C_{10}H_8N_2O_6$ (percent): C, 47.63; H, 3.20; N, 11.11. Found (percent): C, 47.58; H, 3.23; N, 11.08.

EXAMPLE 9

N,N'-1,2-dihydroxyethylenebis(2-pyrrolidone) prepared as described in Example 1 was used as a crosslinking agent to produce wash-wear cotton fabrics. In this process an 8% aqueous solution of this agent with 1.2% citric acid and 0.8% magnesium chloride hexahydrate (as catalysts) was prepared by adding the compounds to water and warming the mixture to dissolve the solids. A textile fabric, 80 x 80 scoured and bleached cotton printcloth, was immersed in the solution and the excess liquid removed mechanically. The fabric was pinned to a frame, dried for 6 minutes at 70°, and cured for 1 minute at 160° C. All these steps can be conveniently carried out with conventional textile finishing equipment. The treated fabric was washed to remove unreacted materials and was found to possess a crease recovery angle of 260° (warp plus fill) compared to a crease recovery angle of about 155° (warp plus fill) for the untreated fabric. Further, 98% of the strength of this treated fabric was retained in the scorch test.

When the above example was repeated using 1% zinc nitrate hexahydrate as the catalyst, satisfactory results were obtained.

We claim:
1. A textile finishing, aqueous composition useful for crosslinking hydrophilic, fibrous, cellulosic textile material comprising from 2 to about 20 weight percent of a compound selected from the group consisting of N,N'-1,2-dihydroxyethylene bis(methylformamide); N,N'-1,2-dihydroxyethylene bis succinimide; and N,N'-1,2-(1,2-diacetoxyethylene) bis succinimide; and about 1 to about 3 weight percent of an acidic catalyst, percent being based on the total weight of the solution.

2. A method of crosslinking cellulosic textile material which comprises impregnating the material with the composition of claim 1 and subsequently drying and heating the impregnated material at a temperature of about 140° to 160° C. until crosslinking of the cellulose is obtained.

References Cited
UNITED STATES PATENTS 3,431,271    3/1969    Van Loo _____ 8—116.3

OTHER REFERENCES

Vail et al., Journal of Organic Chemistry, vol. 30, pp. 1195–1199 (April 1965).

GEORGE F. LESMES, Primary Examiner

J. CANNON, Assistant Examiner

U.S. Cl. X.R.

8—115.7; 252—8.8